Feb. 20, 1951  R. H. MORT  2,542,205
WASHER FOR CLOTH COVERED ROLLERS
Filed June 7, 1946  3 Sheets-Sheet 2
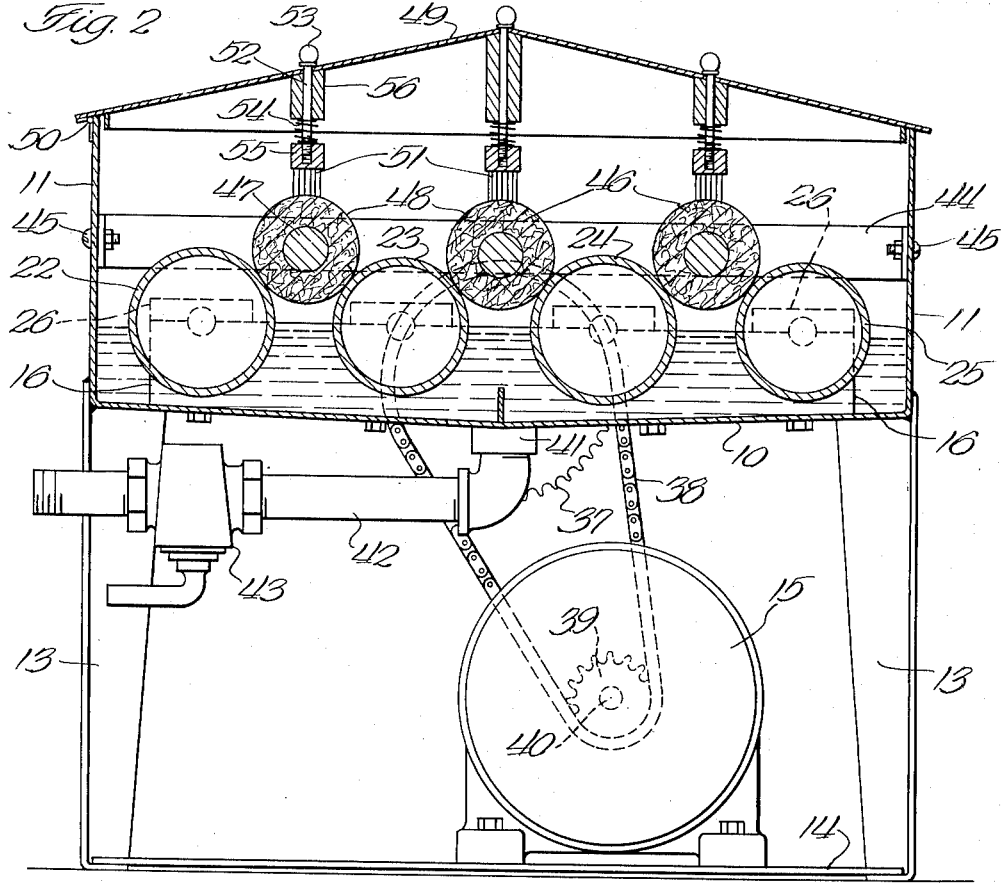
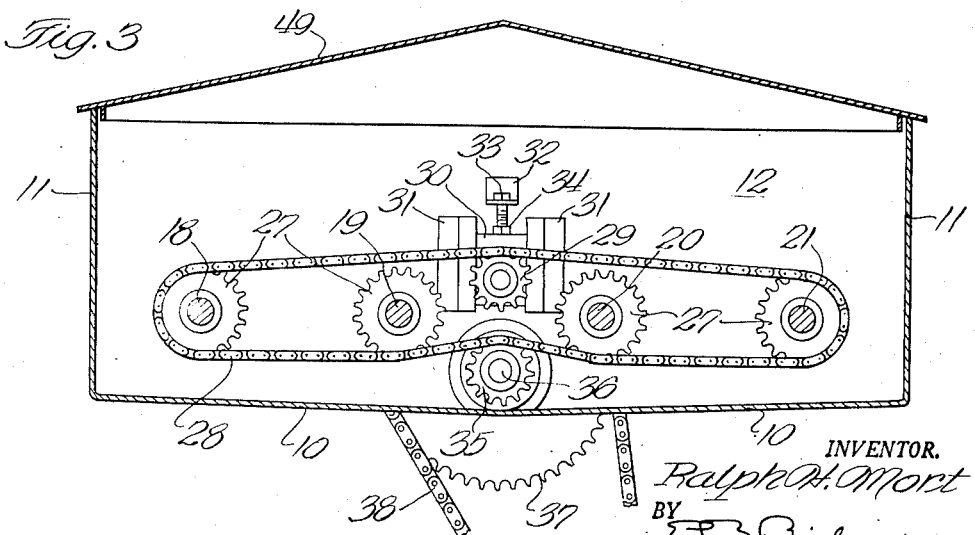
INVENTOR.
Ralph H. Mort
BY
ATTORNEY Feb. 20, 1951  R. H. MORT  2,542,205
WASHER FOR CLOTH COVERED ROLLERS
Filed June 7, 1946  3 Sheets-Sheet 3
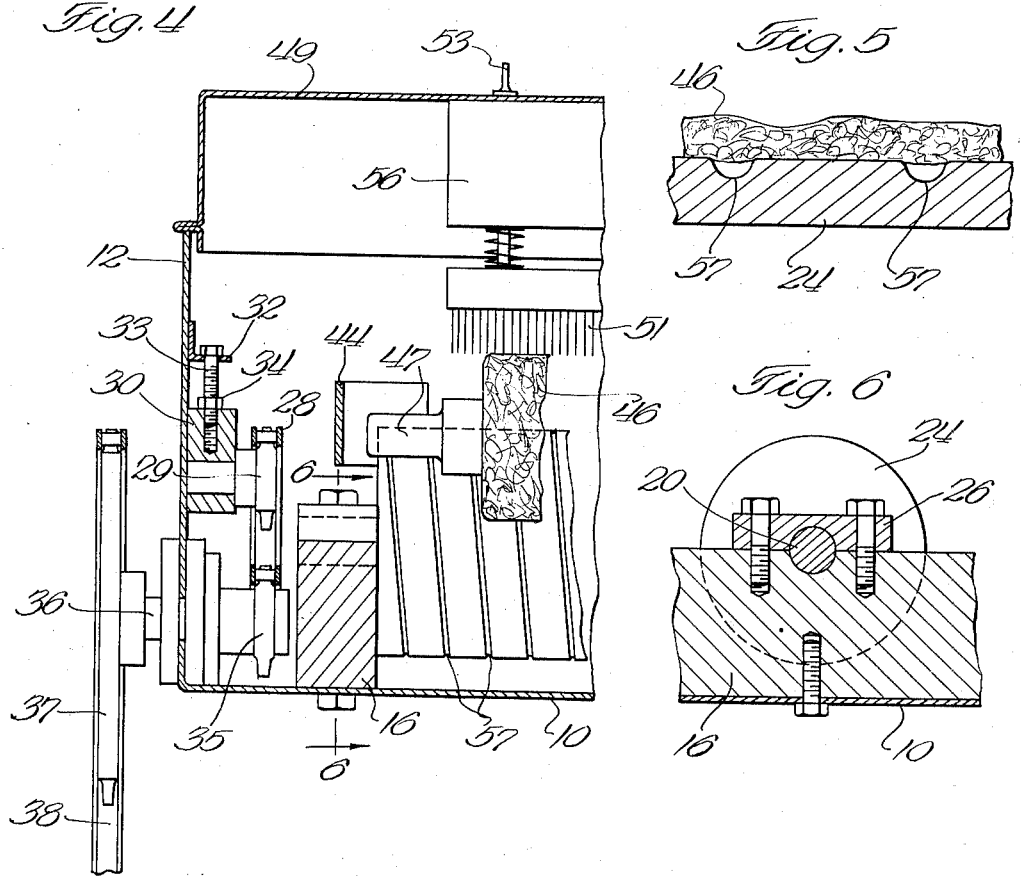
INVENTOR.
Ralph H. Mort
BY
ATTORNEY Patented Feb. 20, 1951

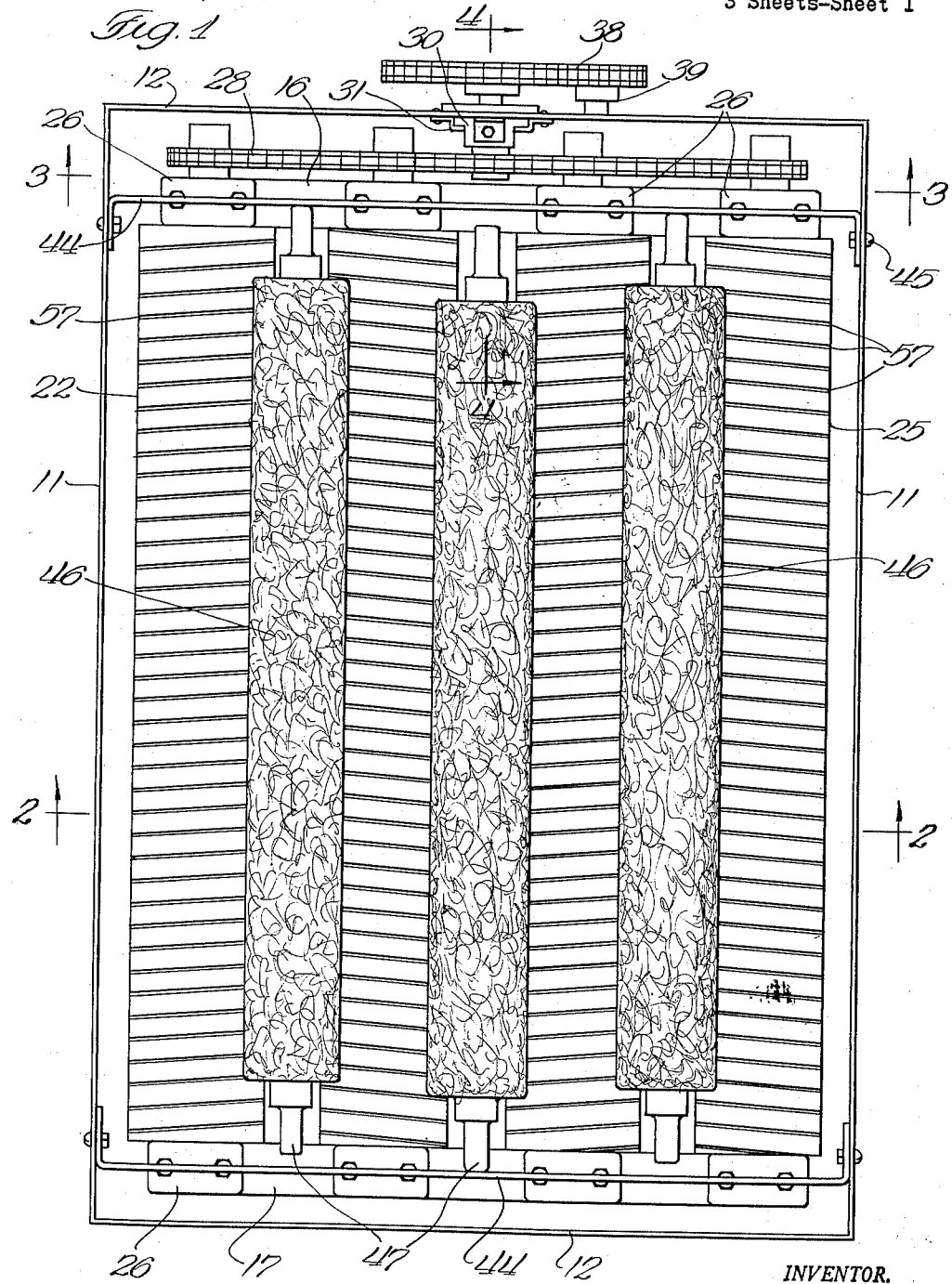

2,542,205

UNITED STATES PATENT OFFICE 2,542,205

WASHER FOR CLOTH-COVERED ROLLERS

Ralph H. Mort, Portland, Oreg.

Application June 7, 1946, Serial No. 674,982

4 Claims. (Cl. 15—4)

This invention relates generally to the printers' art and particularly to a washer for cloth covered dampening rollers such as are used on lithograph presses.

The main object of this invention is to provide a simple and efficient form of washer for cloth covered dampening rollers which will thoroughly wash the rollers without any tendency of getting them "out or round."

The second object is to produce a machine of the class described which will not be severe on the fabric, thereby adding to the life of the rollers.

The third object is to so wash the rollers that they will remain absorbent by avoiding rough or injurious action on the nap of the fabric during the washing operation.

The fourth object is to make it possible for the rollers to retain their uniformity due to equalized friction applied along the entire length of the roller during the washing operation.

The fifth object is to provide a machine which will completely free the roller from loose particles of lint, nap, and small threads of fabric which are a common by-product of hand washing, thereby producing resulting flaws on the printing surface and in the ink.

The sixth object is to provide a machine which will make it possible to use rollers within a shorter time after washing, as a centrifugal force expels the water from the fabric evenly and completely.

The seventh object is the reduction in the amount of labor required in the washing process by making the operation entirely automatic.

The eighth object is to so facilitate the washing of the rollers that they will be washed at once when dirty and not be permitted to accumulate and dry as is commonly the case where roller washing is laborious, thus assuring a constant supply of fresh, soft rollers and avoiding the necessity of extra violent washing when ink has been permitted to dry thereon.

The ninth object is to provide a machine of the class described in which the cloth covered rollers are supported between pairs of helically grooved rollers having different peripheral speeds.

These and other objects will become more apparent from the specification following as illustrated in the accompanying drawings, in which:

Fig. 1 is a plan of the machine with the cover removed.

Fig. 2 is a vertical section taken along the line 2—2 in Fig. 1.

Fig. 3 is a section taken along the line 3—3 in Fig. 1.

Fig. 4 is a fragmentary section taken along the line 4—4 in Fig. 1.

Fig. 5 is a fragmentary section showing the manner in which the fabric rests upon the helically grooved rollers.

Fig. 6 is a section taken along the line 6—6 in Fig. 4.

Fig. 7 is a view similar to Fig. 3 showing a slight modification thereof.

Similar numbers of reference refer to the same or similar parts throughout the several views.

Referring in detail to the drawing, a tank consisting of a bottom 10 having the side walls 11 and end walls 12, all of which are supported by the legs 13, across the feet of which is mounted a base plate 14 upon which rests the operating motor 15.

Between the sides 11 and secured to the bottom 10 are the standards 16 and 17, between which are rotatably mounted the shafts 18, 19, 20, and 21 of the helically grooved rolls 22, 23, 24, and 25, in which it will be noted that the rolls 23 and 25 are somewhat smaller in diameter than are the rolls 22 and 24. The shafts 18 to 21 are held in place by the half bearings 26. The shafts 18 to 21 have each secured thereon a sprocket wheel 27, which in this instance are all of the same pitch diameter. The chain 28 passes around the sprocket wheels 27 engaging the lower side thereof but is held out of engagement with the top side of the sprocket wheels 27 by means of the idler sprocket wheel 29. Sprocket wheels 27 are mounted on the shafts 19 and 20 and said sprocket wheel 29 is mounted on the slide 30 within the guides 31 secured on the end wall 12. An angle clip 32 is secured on the wall 12 and is provided with a chain tightening bolt 33, whose lock nut 34 bears against the slide 30 while the bolt 33 is threaded into the slide 30.

On the underside of the under-run of the chain 28 is disposed a driving sprocket wheel 35 which is mounted on the shaft, on which is also secured a sprocket wheel 37 around which passes the chain 38 which passes around the driving pinion 39 on the shaft 40 of the motor 15.

Connected with the lowermost portion of the tank bottom 10 is a drain connection 41 in whose pipe 42 is disposed a drain cock 43.

Against each side wall 11 and parallel with the ends 12 is a stop bar 44 which is secured to these side walls by means of the bolts 45.

Disposed between each pair of adjacent rollers 22 to 25 inclusive is indicated one of the rollers 46 which it is desired to wash. These rollers are preferably of the composition type mounted on a steel arbor 47 and covered with a tubular knitted web 48 having a soft interior finish of looped threads adapted to provide ample absorptive and resilient properties to the roll covering.

There is provided for the tank a cover 49 which is peripherally attached thereto by the means of the hinges 50 and has mounted to the interior thereof a plurality of brushes 51 adapted to engage the surface of each of the rollers 46.

Each of the brushes 51 is mounted on a slidable stem 52 which terminates in a knob 53 accesible from the top side of the cover 49. Each brush 51 is urged downwardly by means of a spring 54 interposed between the brush holder 55 and the guide 56 for the stem 52.

The rollers 22 to 25 are provided with helical grooves 57 which are pitched in opposite directions on adjacent rollers. It will be noted that in Fig. 1 one of the rollers is bearing against one of the stops 44 while the other two rollers bear against the other stop 44. This is not occasioned by the direction of rotation or the pitch of the grooves, but by the character of the stitches in the knitted fabric coverings. In Fig. 7 there is shown a slight modification in which the rollers 58 are all of the same diameter but are given different surface speeds from the chain 59 by means of the different sized sprocket wheels 60 and 61. The operation of this form of the device is the same as in that previously described, it being important that there be a differential in the surface speeds of adjacent rollers in order that a proper washing action may be performed.

In operating a lithograph press it is necessary to keep the dampening rollers clean to insure good printing. The body of these rollers is of steel, or rubber with a steel core, with from one to three layers of fabric covering. Their purpose is to keep the non-printing areas of the printing plate moist while the press is in operation.

Due to various pigments in the inks and to certain chemicals in the moistening solution a degree of ink "bleeding" takes place which in a short time will saturate the fabric on the dampeners. In consequence they lose their qualities for absorption and distribution of water to the plate. When this occurs it becomes necessary to remove them from the press and wash out the ink.

Present methods of washing the rollers are crude and very unsatisfactory. All require much time and unpleasant labor. Some soak the rollers in a cleaning solvent, then scrape with a flat knife. Others brush vigorously with soap and water. Much manual effort is necessary in any method. Such scraping or brushing of the fabric not only eventually removes the ink but also removes the nap from the surface and destroys the absorbing qualities and likewise the resiliency. Naturally this shortens the life of the fabric covering, but even more serious, the severe brushing results in a loss of uniformity in the diameter of the roller.

I am, of course, aware that numerous forms of washers have been constructed in the past. I therefore do not claim such devices broadly but I do intend to cover such forms and modifications thereof as fall fairly within the appended claims.

I claim:

1. A washer for cloth covered rollers having in combination a pair of parallel driven rolls having oppositely pitched grooves formed in the surfaces thereof continuously along the entire length of the rolls, the adjacent sides of which move in opposite directions, and means for providing a difference in the surface speeds of said rolls, the space between said rolls constituting a saddle in which may be placed a cloth covered roller.

2. A washer of the class described having in combination a container, a pair of rolls mounted in said container having grooves provided throughout their entire lengths which are pitched in the same direction respectively, means for rotating said rolls in the same direction at unequal surface speeds and in spaced relationship whereby a cloth covered roller may be placed above and between said rolls, the grooves in one roll being right handed and in the other left handed.

3. A washer of the class described having in combination a container, a pair of horizontal parallel rolls mounted in said container, said rolls having continuous spiral grooves formed along the entire length thereof, the spirals of each pair of rolls being opposite, the peripheral speed of each pair being different and the direction of rotation of each pair being the same.

4. A washer for cloth covered rollers having in combination a tank, four rollers mounted in said tank in a horizontal plane, means for revolving all of said rollers in the same direction, adjacent rollers being driven at different circumferential speeds, each of said rollers having spiral grooves formed along the entire length thereof, the grooves in the alternate rolls being right handed and in the remaining rolls being left handed.

RALPH H. MORT.

REFERENCES CITED

The following references are of record in the file of this patent:

UNITED STATES PATENTS

| Number | Name | Date |
| --- | --- | --- |
| 696,134 | Crump | May 25, 1902 |
| 734,281 | Olsen | July 21, 1903 |
| 748,593 | Cleathero | Jan. 5, 1904 |
| 892,782 | Wagner | July 7, 1908 |
| 1,002,322 | Sague | Sept. 5, 1911 |
| 1,633,216 | Lakeman | June 21, 1927 |
| 1,683,458 | Hall | Sept. 4, 1928 |
| 1,723,256 | Scott | Aug. 9, 1929 |
| 2,027,407 | Von Webern | Jan. 14, 1936 |
| 2,291,991 | Spraker | Aug. 4, 1942 |

FOREIGN PATENTS

| Number | Country | Date |
| --- | --- | --- |
| 32,796 | Germany | Aug. 29, 1885 |
| 56,682 | Austria | Dec. 10, 1912 |